United States Patent [19]

Chamberlain et al.

[11] Patent Number: 5,749,672
[45] Date of Patent: May 12, 1998

[54] IRRIGATION PROCESS

[75] Inventors: Peter Chamberlain, Shipley, United Kingdom; Richard Everett Cole, Oakdale, Calif.

[73] Assignee: Allied Colloids Limited, West Yorkshire, United Kingdom

[21] Appl. No.: 502,218

[22] Filed: Jul. 13, 1995

[30] Foreign Application Priority Data

Jul. 15, 1994 [GB] United Kingdom ............. 9414302

[51] Int. Cl.$^6$ ............................................. E02B 13/00
[52] U.S. Cl. ....................... 405/36; 405/37; 405/263; 405/52
[58] Field of Search ........................... 405/36, 43, 37, 405/45, 52, 263; 210/170

[56] References Cited

U.S. PATENT DOCUMENTS

| | | | |
|---|---|---|---|
| 3,114,243 | 12/1963 | Winters | 405/37 |
| 3,268,002 | 8/1966 | Fischer | 405/36 X |
| 3,305,019 | 2/1967 | Katzer | 166/45 |
| 3,435,618 | 4/1969 | Katzer. | |
| 3,633,310 | 1/1972 | Sandiford | 405/36 X |
| 3,839,202 | 10/1974 | Roy | 210/54 |
| 3,860,526 | 1/1975 | Corbett | 252/181 |
| 3,952,522 | 4/1976 | Shettel | 405/37 |

FOREIGN PATENT DOCUMENTS

| | | |
|---|---|---|
| 0 255 283 A1 | 2/1988 | European Pat. Off. . |
| 2 577 563 | 2/1985 | France . |
| 2577563 | 8/1986 | France . |

*Primary Examiner*—Dennis L. Taylor
*Attorney, Agent, or Firm*—Sughrue, Mion, Zinn, Macpeak & Seas, PLLC

[57] ABSTRACT

Soil adjacent to an elongated furrow is irrigated by flowing the water from a header into and along the furrow, and erosion of the furrow is reduced and infiltration into the soil is increased by dissolving solid flocculant in the header or in the furrow into the water. The solid flocculant is best provided as a block of particulate flocculant bonded by a water-soluble wax. The irrigation process is best conducted on a cyclic basis with the solid flocculant being removed from the header or furrow during the cycle and with the supply of water being continued so that there is subsequent run-off of water from the furrow.

20 Claims, No Drawings

5,749,672

IRRIGATION PROCESS

This invention relates to irrigation processes and solid polymeric products for use in them.

There are several different ways of irrigating soil so as to improve the growth of crops in the soil. For instance water can be sprayed from a store of water which may be in the form of stream, canal, pond, lake or river or it can be allowed to flood over the soil, from such a store.

One important method of irrigating soil comprises furrow irrigation in which water is supplied into and caused to flow along a furrow and irrigation occurs as a result of infiltration (or permeation) of water from the furrow into the adjacent soil. In particular, there is lateral movement of water through the base and sides of the furrow, this often being referred to as lateral subbing.

The furrow irrigation technique is usually conducted batch wise by a process which involves supplying water from a header into the inlet end of the furrow and allowing the supplied water to flow along the furrow and to infiltrate from the furrow into the soil adjacent the furrow. This infiltration occurs as the water advances towards an outlet end of the furrow and thereafter as the water runs-off from the outlet end.

The period during which the water is advancing towards the outlet may be referred to as the advance stage, and during the advance stage there is no run-off from the outlet end. Lateral subbing will start to occur at the inlet end as soon as water starts to advance along the furrow, but lateral subbing cannot occur at the outlet end until run-off is occurring. Accordingly it is normal to allow run-off to occur for sufficient period to provide adequate lateral subbing adjacent to the outlet end. The supply of water is then terminated as a result of which all the water in the furrow will permeate into the soil and the furrow may tend to dry out, to wait for the next cycle when the farmer decides that further irrigation is needed.

The furrow usually discharges its run-off into a tail ditch. Generally a plurality of furrows extend from a single header ditch and generally a plurality of furrows lead to a single tail ditch. The tail ditch for one set of furrows may serve as the header ditch for another set. Alternatively the tail ditch, or the individual furrows, may discharge their run-off into a river, lake or other natural water course.

The effectiveness of this process depends in part on soil type and soil structure, but it is known to give problems. These are caused especially by the presence of clay or silt in the soil and thus the problems are particularly serious on soils with a high clay or silt content.

One problem is that there is a tendency for the water to wash soil from the furrows into the tail ditch, with the result that the irrigation can promote soil erosion. Another problem is that there is a tendency for the soil in the base of the furrow to become compacted and caked as a result of the flow of irrigation water, with the result that there is inadequate permeation of water into the land adjacent the furrow. This is especially true if the furrow has dried out between irrigations. This compaction and caking can result in the water flowing through the furrow very much faster than is desirable, and this can further promote soil erosion. Also, if infiltration or permeation from the furrow into the soil is proving inadequate, there is a natural tendency or need to irrigate for longer periods, and this again tends to promote soil erosion.

The fact that furrow irrigation does cause undesirable soil erosion is well acknowledged and valuable soil has been lost from previously fertile areas over many years. For instance the Snake River in Idaho U.S.A. is reknowned for turning brown in May and June each year due to the annual start-up of furrow irrigation.

Despite the long standing problem, no satisfactory solution to it has previously been proposed.

It has been well known for many years that the structure of soil can be improved by cultivating into the soil various water-soluble polymeric materials. These materials are generally known as soil conditioners and have the effect of bonding the soil particles in crumbs of soil into an open structure having increased resistance to collapse. This soil conditioning effect can be obtained with a wide range of molecular weights, and many soil conditioners have low or medium molecular weight.

A water-retention product for use in agriculture and which comprises polyectrolyte and polyethylene glycol is described in FR-A-2577563.

It is known from, for instance, U.S. Pat. No. 3,305,019, U.S. Pat. Nos. 3,839,302, 3,860,526 and EP-A-255283 to introduce polyelectrolyte into a liquid by flowing the liquid over a shaped body containing the polyelectrolyte.

Soil conditioners are usually applied direct to the soil that is being cultivated, but it is also known to include polymer in irrigation water. Thus, in U.S. Pat. No. 3,435,618 Katzer proposed applying flocculant in an irrigation canal to promote water penetration of the soil. He also proposed adding a flocculant to irrigation streams, stock ponds, lakes and rivers. He stated that a very small amount of flocculant in the water "will not flocculate solids but will have a beneficial effect in increasing the rate and depth of water penetration thus promoting shorter irrigation periods and more efficient use of the water". He also stated that the amount of flocculant must be carefully controlled as too much "will tend to produce the reverse of the desired effect. That is too much of the flocculant will have a tendency to flocculate suspended particles in the irrigation water and thus blind the surface of the soil to be irrigated".

Accordingly, Katzer teaches a process in which suspended solids in the irrigation water must not be flocculated and that flocculation of them will reduce infiltration. Accordingly Katzer does not offer any solution to the problem of preventing soil erosion by the removal of suspended soil particles with the run-off while improving infiltration.

Katzer proposes that his effect of improved infiltration without any flocculation of suspended solids should be achieved by providing a predetermined rate of dissolution of a molded flocculant article formed from anionic polymer and polyethylene oxide. Although he mentions molecular weights up to 15 million or more, in the example the polymer is a 30% hydrolysed polyacrylamide having molecular weight at least 2 million. Katzer proposes that the molded article can be dissolved under static conditions or in a flowing stream and that a uniform sustained release of polymer can be achieved if the molded article has a surface area which does not change appreciably as it dissolves, preferably a disk shape. The use of sodium, ammonium or potassium chloride or ammonium nitrate, phosphate or sulphate as a diluent to adjust the dissolution rate of the molded article is mentioned.

The applicants have become aware that the Idaho State Soil Conservation Service (SCS) of the United States Department of Agriculture issued a draft interim standard as a Field Office Technical Guide, July 1994 but the actual date of publication is not known to the applicants. This guide refers to the addition to the furrow irrigation water of a solution of polyacrylamide flocculant and recommends that addition of the solution should terminate when run-off has started. The flocculant is described as being supplied as a liquid or as being made-up as a solution by dissolving powdered flocculant in water. It is emphasised that it is essential that all the powder must be completely dissolved. These techniques necessitate either transporting large volumes of solution to the place of use or the provision of bulky make-up apparatus and a source of clean water at the place of use, and both of these are inconvenient and have proved impracticable.

Accordingly, even if this Guide was published before 15 Jul. 1994 (which is not admitted), there remains an urgent need to provide a method for reducing erosion of the furrow and maintaining or increasing infiltration.

A process according to the invention of irrigating soil adjacent to an elongated furrow that leads from the inlet and to an outlet end comprises providing a supply of water from a header into the inlet end and allowing the supplied water to flow along the furrow and to infiltrate from the furrow into the soil adjacent the furrow as the water advances towards the outlet end during an advance stage and thereafter as water runs-off from the outlet end and then terminating the supply, and in which erosion of the furrow is reduced and the infiltration is increased throughout the process by flocculating suspended soil particles from the water by positioning water-erodible block material which contains water-soluble polymeric flocculant at a dissolution position in the header or inlet end and flowing the supply of water turbulently over the block material from the start of the advance stage and thereby dissolving polymeric flocculant into the supply of water, and removing any residual block material from the dissolution position before substantial run-off occurs.

After a sufficient supply of water has been provided to give the desired amount of infiltration along the length of the furrow, and thus the desired amount of run-off, the water supply is terminated in conventional manner and the furrow is allowed to drain dry and usually also to evaporate dry. When it is desired to conduct further irrigation, the supply of water from the header into the inlet end is resumed. The structure of the furrow may be such that this water will not cause erosion and will infiltrate satisfactorily without the addition of further flocculant. Generally, however, when the supply of water is resumed the entire process is repeated, namely the water erodible block material is located at a dissolution position from the start of the advance stage and is removed before substantial run-off occurs. This is required particularly when the soil surface has been cultivated or otherwise disturbed since the previous irrigation.

By the invention, we stabilise the soil aggregates in the furrow and we obtain flocculation of the suspended soil particles in the furrow. We obtain reduced erosion of the furrow throughout the entire process (including the run-off period when no fresh flocculant is being dissolved into the water). We obtain improved infiltration. Thus, we flocculate soil particles in the inlet end into the base of the furrow as a result of appropriate dissolution of appropriate flocculant at the start of the process and we obtain a clear supernatant which advances down the furrow. Further, the water that is flowing down the furrow, and the run-off from the outlet end of the furrow, remains clear, and substantially free of suspended soil particles, for prolonged periods after the removal of the flocculant block material. The supernatant appears clear relative to normal, turbid, run-off liquor, and in the invention the flowing supernatant usually appears clear when viewed by the naked eye.

We achieve flocculation of the suspended soil particles close to the position where they are initially entrained and so there is little or no tendency to carry suspended particles along the length of the furrow and thereby to erode the start of the furrow or to fill the end of the furrow. The invention therefore eliminates or reduces the traditional need repeatedly to dig out and to reshape the furrow manually.

The floc structure which is obtained provides the base of the furrow with an open texture that remains open even when the base of the furrow dries. In particular, careful observation shows that the flocs which are deposited in the base of the furrow have a relatively strong particulate structure such that they have a rolling movement as water flows over them. Thus we stabilise both the flocs and the aggregates in the soil. The flocculation of the suspended soil particles prevents blinding of the base of the furrow and prevents erosion of the base and walls of the furrow and does instead result in the deposition of a layer of particulate floc material which increases infiltration.

It is necessary that sufficient of an effective flocculant should dissolve from the water-erodible block material at the very start of the advance stage that the advance front of water as it starts to travel down the furrow does contain sufficient flocculant to provide the desired flocculation. Suitable flocculants tend to dissolve slowly and/or to suffer from gel blocking and the degree of agitation obtained merely by laying the block material in the water as it flows along the header or along the inlet end will be inadequate to dissolve sufficient flocculant sufficiently quickly to provide a sufficient amount of dissolved flocculant in the advance front to prevent erosion by the advance front. It is therefore necessary that the water should be made to flow over the block material with more turbulence than would normally be present in the header or inlet end. One way of achieving this is to flow the water over the block while it is not submerged or is only partly submerged in water at the dissolution position, since this results in splashing and increased erosion of the block. Thus preferably the water falls onto exposed surfaces of the block material ie onto surfaces which are not protected from the falling water by being submerged under water.

It is preferred that the block material should be located at a point where the water pours downwardly onto the block material, which is generally only partly submerged in water at this position. The downward pouring of the water conveniently is provided by flow over a weir in the header or inlet end or by the flow from a discharge duct, for instance a duct leading from the header into the inlet end. Thus one or more weirs may be provided in the header and/or inlet end and block material may be located adjacent each weir on the downstream side of it. Alternatively, there may be a syphon on pump duct leading from the header into the end and block material may be located beneath the discharge point from this duct. However any other way of generating a waterfall onto the block may be used. There may be one or more dissolution positions in the header and/or in each furrow.

It is important in the invention that there should be no block material in the header or inlet end dissolving into the water supply once substantial run-off is occurring. This economises in the use of polymer, does not increase erosion or reduce infiltration, and reduces the risk of significant amounts of dissolved flocculant being present in the run-off water and possibly reaching a river or other natural water course.

It is possible to perform the invention merely by selecting carefully the amount of block material which is provided at the dissolution position such that it is all utilised before substantial run-off occurs. However it is preferred to conduct the process using excess block material and to remove the residual block material from each dissolution position before substantial run-off occurs. Thus substantially all block material not dissolved into the water supply should be removed before substantial run-off occurs so as to prevent further dissolution of it. This removal can occur either at approximately the time when run-off is about to occur or slightly afterwards or at an earlier stage.

For instance it can be satisfactory for dissolution to be terminated while the advance front is still only, for instance, ½ to ¾ of the way along the furrow. Usually, however, the supply is terminated when the advance front is between ¾ of the way along the furrow towards the outlet end and near the start of run-off. Since the length of the furrows is such that the precise start of run-off may not be known exactly, it is sufficient if removal occurs at a time which is estimated to be close to or within, for instance, half an hour of when run-off is expected to start. In practice the rates of flow may vary in different furrows, for instance due to variations in compression (due to tractor wheels) in some of the furrows, and several furrows are usually treated substantially simultaneously. Typically, the polymer is removed when run-off has started or is about to start in the great majority (eg 90%) of the furrows.

The duration of the advance stage and the run-off stage will depend upon the length of the furrow and the overall process conditions. For instance the furrow may extend from around 100 meters to as much as 1,000 meters. Correspondingly, the advance stage may be as little as one hour or as much as twelve hours or even 18 hours. The run-off stage is usually at least ¼ or ½ of the duration of the advance stage but is not usually more than the duration of the advance stage, or 1.5 or 2 times the duration of the advance stage at most. Typically the advance stage starts in the morning and finishes early to late afternoon and the run-off stage continues to the next morning.

In order to facilitate removal of the residual block material, the block material is preferably contained within a cage, the cage is located in the dissolution position before or at the start of the advance stage, and the cage is removed from the position before substantial run-off occurs. The cage can be any water-permeable container which is such that water flowing around or through the container dissolves flocculant from within the container. For instance the container can have one or more walls formed of mesh material or it can be formed of a permeable fabric. Typically the cage can be an open dish or other container formed of wire netting or plastic netting having a mesh size of, for instance, at least 5 mm and usually at least 10 mm. The mesh size should be small enough to retain relatively small blocks of material, e.g. below 30 mm or 50 mm. Instead of using a cage container, any other type of support holder for the block material can be used.

The preferred way of performing the process is to provide the cage with more block material than will be required during a cycle of the process, remove the cage while it contains undissolved block material, and add fresh block material to the cage ready for reuse in the next cycle in the same furrow or in a different furrow. The block material in the cage is preferably added as a plurality of blocks so that the cage normally contains at least, for instance, 3 or 5 blocks and often up to, for instance, 15 or 20 blocks. The use of a plurality of blocks in this manner, coupled with the replenishment of the blocks between each cycle, results in more uniform availability of flocculant during each cycle and from one cycle to the next. If a single large block is used its surface area will gradually reduce, but if a plurality of blocks are used and are replenished then the total surface area is held more constant. Each block generally has a minimum dimension of at least 15 or 20 mm and often 30 mm or 50 mm, and a maximum dimension of 100 mm or more. Typically the blocks have a minimum dimension of 20 to 100 mm and a maximum dimension of 50 to 200 mm.

It is sometimes preferred for a dissolution position to be at the point where the water is supplied into the furrow from the header. Locating the flocculant only in the furrow eliminates the risk of flocculation and sedimentation of suspended material occurring in the header or of causing blockage in any pump used for delivering water from the header into the furrow. If flocculant is positioned in the header, it is generally preferred for the water to be supplied from the header into the furrow by a syphon, thereby facilitating the maintenance of satisfactory flow despite possible flocculation in the header.

The degree of turbulence is selected to obtain the desired dosage of flocculant. This is usually in the range 1–20 ppm, often 2–10 ppm.

The flocculant should be a high molecular weight anionic polymeric flocculant which is effective for flocculating the suspended soil in the irrigation water to form visible granular flocs in the base of the furrow. Anionic flocculants are generally selected because they are the most effective and because they do not introduce cationic components in the environment. The presence of cationic material such as alum or cationic polymeric material in the block is undesirable and should be avoided.

The anionic flocculant used in the invention is preferably a water-soluble polymer of water-soluble ethylenically unsaturated anionic monomer, optionally copolymerized with water-soluble ethylenically unsaturated non-ionic monomer, for instance in an amount of 0 to 95% by weight of the monomer blend. The preferred flocculants are copolymers of acrylamide with 5 to 50 mol % water-soluble anionic monomer. Any suitable ethylenically unsaturated anionic carboxylic or sulphonic monomer may be used, but the preferred polymers are copolymers of 9 to 95% by weight acrylamide and 5 to 50 wt % sodium acrylate. Particularly suitable materials are sold by Allied Colloids Limited under the trade names Magnafloc 155 and Magnafloc 156 and Magnafloc LT25 in UK and Percol 155 and Percol 156 and Percol LT25 in U.S.A.

In order that the desired flocculation of suspended soil particles does occur, it is necessary for the polymer to have a high molecular weight, preferably above 10 million.

It is convenient to define molecular weight in terms of intrinsic viscosity, measured using a suspended level viscometer at 25° C. in 1N sodium chloride buffered to pH7. The preferred flocculants for use in the invention have intrinsic viscosity (IV) at least 10 dl/g and preferably at least 12 dl/g. For instance it may be 14 to 30 dl/g most preferably around 15 to 20 dl/g.

Blocks consisting solely of the polymeric material may suffer from gel blocking and tend to dissolve at an adequate rate only if the water flows over the block with an inconveniently large amount of turbulence. It is therefore preferred for the block material to be formed of a particulate flocculant bonded by water-soluble diluent into the block shape.

The particulate flocculant can have any desired particle size but it is usually below 2 mm and preferably at least 90% by weight of the flocculant particles are below 1 mm in size. It is particularly preferred that the particles should be smaller than this, preferably at least 90% by weight below 100 to 150 μm in size. The use of polymer particles, and especially very fine polymer particles, can facilitate rapid dissolution of the polymer, especially when the individual particles are eroded from the block and entrained in the turbulent water.

The powdered polymer is preferably made by reverse phase bead polymerisation followed by drying and separation of the beads from the organic liquid. These methods typically give a particle size 90% by weight in the range 100 to 1000 μm after removal of fines. The powdered particles that are used can be coarse bead particles in this range but it is often preferred that they are a fraction separated from a mixture of bead lines and coarser beads. For instance the separated fines may have a size 90% by weight below 100 μor 150 μm and often lower such as 90% by weight below 70 μm. Alternatively the powder may have been made by gel polymerisation followed by comminution and drying (and often fractionation) or other conventional method.

The diluent by which the particles are bonded into block material can be any water-soluble bonding agent by which the block can be formed and which will permit erosion of the block by the turbulent water. Preferably the bonding agent is non phytotixic, non toxic to the crops that are likely to be grown in the soil, non toxic to mammals and non toxic to fish. Preferably it is unattractive to vermin. Cationic materials are generally undesirable and so the bonding agent is preferably non-ionic or anionic. The preferred bonding agent is polyethylene glycol but other water soluble non-anionic or slightly anionic polymeric binders may be used.

The bonding agent is preferably a meltable material, ie a wax, since this facilitates the production of block material by forming a dispersion of the particulate polymeric flocculant (substantially anhydrous) with a melt of the bonding agent and converting the melt dispersion into block material of the desired shape. Suitable techniques and materials are described in PCT/GB95/00282 (including the U.S. designation therein) filed 10 Feb. 1995 by Allied Colloids Limited et al, the entire disclosure of which is herein incorporated by reference. For instance powdered polymeric flocculant may be mixed with a melt of the binder, the melt may be shaped into the desired block shape in or on a suitable mold and the melt may then be cooled so as to solidity the bonding agent.

The molten dispersion may be shaped by being poured on to a surface that will serve as an open mould or it may be moulded under atmospheric pressure or under elevated pressure. For instance it can be made by a process comprising extruding the molten composition. It is also possible to make the block by extruding, cutting or otherwise shaping previously solidified composition to the desired shape and size, provided the wax matrix is sufficiently soft to allow such extrusion, cutting or other shaping.

The dispersion of polymer particles in molten wax can be made merely by blending the particles as a powder with the molten wax. The powder will usually have a size mainly above 10 μm.

When the polymer particles are made by reverse phase polymerisation and supplied as a reverse phase dispersion, the dispersion of the particles in molten wax can be made by forming a hydrous or, preferably, anhydrous reverse phase dispersion of the polymer particles in a volatile organic liquid in which the wax is mixed (as a solution or dispersion), and evaporating the organic liquid by distillation at a temperature above the melting point of the wax. Usually the polymer particles are made by reverse phase polymerisation is volatile liquid in the absence of the wax to produce the polymer dispersion in volatile liquid, the wax is then mixed into the organic liquid, generally at a temperature which is above the melting point of the wax, and the organic liquid is then distilled from the dispersion. The polymerisation may be conducted in conventional manner using an initiator to induce polymerisation, a polymeric stabiliser and/or an emulsifier to promote the formation and stability of the initial dispersion. The particles may be below 10 μm and made as a reverse phase emulsion, or may be coarser (e.g., 90% by weight between 100 μm and 1 mm) and made by reverse phase bead polymerisation.

Accordingly, in this reverse phase method the particles may have a size as low as, for instance, 0.01 μm or as large as 1 mm, but it is usually 0.05 to 50 μm and generally 0.05 to 10 μm.

The initial reverse phase dispersion contains water in the polymer and some or all of the water may be distilled during this distillation of the organic liquid if it has not previously been removed by distillation. Accordingly, the polymer particles in the cooled, solid product are usually substantially anhydrous, for instance containing below 10% water based on the weight of polymer.

Instead of making the particles by reverse phase polymerisation in the volatile liquid, it is possible to mix preformed powder into volatile liquid to form the starting dispersion.

The volatile liquid may be, for instance, an aliphatic or aromatic or cycloaliphatic hydrocarbon, an ether, an ester, or an alcohol, or a mixture of two or more of these, provided it is sufficiently volatile to be removable by distillation at the end of the process and is essentially immiscible with water. Examples are Exxsol D40 (trade mark), toluene, xylene, hexane, cyclohexane, diacetone alcohol, ethyl acetate, butyl acetate, and propylene glycol monomethyl ether.

The wax which can be any water-soluble substance or mixture that is solid at normal temperatures but is liquid at the temperature at which the volatile liquid is removed or, in the process using powdered particles, at a convenient temperature for blending the wax with the particles. Usually the melting point of the wax should be above 30° C. and often above 40° C. It is usually undesirable to have to heat the mixture to too high a temperature and so preferably the melting point of the wax is not above 200° C., and most preferably it is not above 120° C. These are the melting points of the matrix, and so may be the melting point of the single material, when the matrix is formed of a single material, or may be the melting point of the molten blend that forms the matrix.

The wax is preferably selected such that it melts or dissolves or disperses readily under normal conditions of use of the solid product.

The wax having the defied melting point may be a single material or may be a blend of one or more materials that will provide the matrix. Any such blend may include material that does not form part of the melt phase when the total wax blend is molten, but the amount of non-meltable components is usually as low as possible since their inclusion will tend to reduce the amount of polymer particles that can be satisfactorily included in the product form part of the melt phase.

The wax matrix may consist of or comprise water soluble or water dispersible waxes. The amount of such waxes is preferably the predominant amount (above 50% by weight of the matrix) and is preferably above 80% by weight of the matrix. Examples include polyethylene glycols, for example, PEG 1450, PEG 4000, PEG 8000, polyethylene glycol esters, for example, PEG 8000 distearate, fatty acids, for example stearic acid or salts for example sodium or ammonium stearate, amides of fatty acids, for example, stearic acid diethanolamide, or fatty alcohols.

The amount of wax matrix or other bonding agent is usually at least 10% and generally at least 25% by weight of the block material. It tends to be uneconomic to use too much wax and so preferably the dry weight ratio polymer :wax is about 3:1 to 1:2. Best results are generally obtained with a ratio of about 2:1 to 1:1, for instance about 50 to 60% by weight polymeric flocculant and about 40 to 50% by weight PEG 4,000 or other wax.

Components that are introduced with the wax and which do not go into the melt phase are excluded when considering the ratio of polymer particles:wax matrix and are usually present in very small amounts, usually less than 20% and usually below 5% by weight of the melt phase. However in some instances larger amounts may be required when the components are to provide a useful effect. For instance additives to promote erosion and dissolution of the block material can be present in larger amounts, but usually any such additives are present in amounts of less than 20% of the total block weight.

It is proposed by Katzer in U.S. Pat. No. 3,435,618 that the dissolution of his blocks can be accelerated by including, for instance, ammonium sulphate. We find that, in practice of the present invention, this may not increase the rate of availability of the polymer in the invention, partly because of the consequential reduction in the proportion of polymer in the block. Instead, we find that erosion of the block material and dissolution of the flocculant can be promoted better by imparting a foamed structure to the matrix, for instance by volatilising material within the melt. The material which is volatilised may be, for instance, carbon dioxide which is liberated within the melt, for instance by thermal decomposition of a carbonate or bicarbonate, such as sodium bicarbonate. A suitable amount of sodium bicarbonate or other decomposable carbonate or bicarbonate is from 3 to 15%, preferably around 5 to 10%, by weight of the total block material.

In another embodiment of the invention, a process of irrigating soil adjacent to an elongated furrow that leads from an inlet end to an outlet end comprises providing a supply of water from a header into the inlet end and allowing the supplied water to flow along the furrow and to infiltrate from the furrow into the soil adjacent the furrow, and reducing erosion of the furrow and increasing infiltration by flocculating suspended soil particles from the water by flowing the water in the header or the inlet end over solid anionic polymer flocculant which is a water-soluble polymer of water-soluble ethylenically unsaturated anionic monomer optionally with non-ionic monomer wherein the polymer has IV at least 12 dl/g and preferably at least 15 dl/g. Preferably the polymeric flocculant is provided as block material formed of particles of the flocculant bonded by a water-soluble meltable binder and the block material is located at a dissolution position where the water pours downwardly over the block material. Preferably this is from a weir or from a discharge duct. For instance it may be in the inlet end beneath the discharge from a pump from the header.

A preferred process according to the invention comprises pumping irrigation water into the inlet end of the furrow and discharging the water over block material comprising solid anionic polymeric flocculant and thereby dissolving flocculant into the water and flocculating suspended solids in the furrow and improving infiltration of irrigation water from the furrow, wherein the block material is formed of flocculant particles having a size 10 µm to 2 mm formed from acrylamide and 5 to 50 mol % sodium acrylate and having intrinsic viscosity at least 12 dl/g and bonded by water-soluble polyethylene glycol.

In another aspect of the invention, instead of using, and removing before substantial run-off occurs, the water erodible block material described above, erosion of the furrow is reduced and infiltration is increased throughout the process by flocculant suspended soil particles from the water by including dissolved polymer flocculant agent into the water substantially only during the advance stage, in which the dissolved polymeric flocculant agent is included in the water by contacting the water in the header or in the inlet end turbulently with the polymeric flocculant in solid form from the start of the advance stage and terminating the contact before there is substantial run-off thus in this embodiment the water may be contacted with the solid flocculant by adding the flocculant as powder to the water from the start of the advance stage and turbulently mixing the powder into the water and terminating the addition of the powder before there is substantial run-off. Thus the powder may be added at a dissolution position in the header or in the inlet end where the water pours downwardly over a weir or from a discharge duct by which the water is pumped or syphoned from the header into the inlet end.

The following examples illustrate the invention.

EXAMPLE 1

A field in California was being irrigated by a system of substantially parallel header and tail ditches with furrows leading between them. A pump was used to lift water out of the header ditch and, at any one time, to discharge water into the header end of several of the furrows. When adequate irrigation from those furrows had been achieved, the outlets from the pump were moved to feed water to other furrows. Water was pumped into each furrow at the rate of about 35 liters (8 U.S. gallons) per minute.

When no treatment had been applied to the water, it was found that the furrows tended to become compacted and caked and the water flowed through the furrows quickly carrying a substantial amount of suspended soil from the furrows with it into the tail ditch.

Cylindrical blocks were formed by slurrying 60% Magnafloc 155 (IV 18 dl/g copolymer of acrylamide and sodium acrylate) fine beads in 40% molten polyethylene glycol and then solidifying the melt dispersion in the shape of blocks. The beads had a size below 150 µm.

A block was inserted at the head of a fresh furrow, positioned where the water was pumped into the furrow and flowed over the block. It was found that this furrow did not become caked, the water too, much longer to reach the tail ditch (because of permeation of water through the furrow) and the water that did reach the tail ditch was much clearer and contained much less suspended soil.

EXAMPLE 2

Blocks were made as in Example 1 to weights of 300 grams, 150 grams and 75 grams. Irrigation was conducted through 5 furrows fed from a single header ditch, the slope was 1.5% and the erosion on this particular field had previously been considered severe. The soil was a silt loam and onions were recently seeded prior to the application.

Each of the furrows was fed with irrigation water at about 30 liters per minute from the header ditch by a syphon tube leading into the inlet end of that furrow.

In Furrow A, a 300 gram block was located directly beneath the syphon tube such that the water poured onto it a splashed it.

In Furrow B, a 150 gram block was positioned in a similar dissolution position.

In Furrow C, a 75 gram block was positioned in a similar position.

In Furrow D, a similar 75 gram block was laid in the base of the furrow 45 cm downstream from the syphon tube outlet.

In Furrow E, no block was provided.

Water started flowing down all five furrows at approximately the same time. After about 7½ hours the blocks in Furrows B and C had been completely eroded but in Furrow D about half the block remained and some block remained in Furrow A. Run-off had started in Furrow E and was cloudy. Run-off had not yet started in the treated furrows. The water in these appeared clear.

After about another two hours the block in Furrow A had completely eroded and run-off had started from Furrows A, B and C and was substantially clear water with no evidence of significant suspended solids. Run-off in Furrow D had not yet started and the water in this furrow was slightly turbid. The block had completely degraded. The water flowing from Furrow E was turbid.

After 24 hours total flow, water from Furrows A, B and C were still running clear with no evidence of erosion. Water from Furrow D was running off slightly turbid and there was some evidence or erosion. Water from Furrow E was loaded with sediment.

EXAMPLE 3

Blocks each having dimensions of about 100 mm×100 mm×100 mm were formed by casting a melt dispersion as in Example 1. These blocks were broken down into small blocks having a size about 25 mm×25 mm×25 mm.

A furrow irrigation system consisting of a header ditch and parallel furrows leading to a tail ditch and extending over about two hectares was created in a clay loam soil being used for growing corn. Water was supplied to the head ditch at about 0.9 cubic feet per second (approximately 1,600 liters per minute).

5 kg of the small polymer blocks were placed in a wire basket having a mesh size of about 12 mm which was suspended in the upstream end of the header ditch immediately downstream of a weir, created in part by the basket, arranged such that water fell from the center of the head ditch onto the blocks. This released about 10 ppm of polymer into the irrigation water which was syphoned from the header ditch into the furrows.

The advance time through the furrows was about 9 hours at which time the basket was removed. It contained 1 to 2 kg block and thus the total dosage had been a little under 1 kg block per acre. Irrigation was continued, in the absence of the block material, for 15 hours after run-off started.

When compared to a corresponding furrow irrigation area where block material had not been used, it was apparent that the presence of the block material during the advance stage had increased infiltration, rendered the run-off liquid substantially clear, throughout the run-off period, caused flocculation in the furrow, and prevented erosion.

As a result of the invention, it is possible to improve infiltration significantly, often by 15% and sometimes by as much as 40% or more, and it is possible to essentially eliminate the previous need for repeated manual clearing of the furrows.

EXAMPLE 4

This example shows the preparation of a foamed block for use in the invention.

A blend was formed of 50 pbw bead fines of a copolymer of acrylamide and sodium acrylate having IV 18 dl/g and 50 pbw polyethylene glycol 4,000 by mixing the materials at a temperature at which the polyethylene glycol is molten. The resultant melt dispersion was cast into blocks and allowed to cool.

This process was also conducted with the addition into the melt dispersion of amounts of sodium bicarbonate ranging from 2 to 15 pbw.

The blocks were then positioned under falling water and the rate of dissolution of the blocks was observed.

As regards manufacture, it was found that the melt dispersion became increasingly difficult to handle and cast as the amount of sodium bicarbonate increased, especially above 10 pbw.

As regards the rate of dissolution, it was found that this increased as the amount of sodium bicarbonate in the melt dispersion increased, and that the best combination of solubility and workability was achieved at around 6 to 10 pbw sodium bicarbonate.

Observation of the blocks showed that the solid blocks had a foamed structure due to the liberation of carbon dioxide from the sodium bicarbonate during the melt mixing and as the molten mix was gradually cooled to form blocks.

We claim:

1. A process of irrigating soil adjacent to an elongated furrow that leads from an inlet end to an outlet end, the process comprising providing a supply of water from a header into the inlet end and allowing the supplied water to flow along the furrow and to infiltrate from the furrow into the soil adjacent the furrow as the water advances towards the outlet during an advance stage and thereafter as the water runs-off from the outlet end, and then terminating the supply, and in which erosion of the furrow is reduced and the infiltration is increased throughout the process by flocculating suspended soil particles from the water, the flocculating being caused by a process comprising providing a water-erodible block material which contains water-soluble polymeric flocculent at a dissolution position in the header or inlet end of the furrow and flowing the supply of water turbulently over the block material whereby water falls onto exposed surfaces of the block material from the start of the advance stage and thereby dissolving flocculent into the water, and removing any residual block material from the dissolution position before substantial run-off occurs.

2. A process according to claim 1 further comprising locating the dissolution position at a point where the water falls downwardly onto the block material from a weir in the header or in the inlet end or from a discharge duct from the header into the inlet end.

3. A process according to claim 1 further comprising containing the block material within a cage, the cage being located in a dissolution position before or at the start of the advance stage, and the cage is removed from the dissolution position before substantial run-off occurs.

4. A process according to claim 1, further comprising containing the block material within a cage, the cage being located in a dissolution position before or at the start of the advance stage, and the cage being removed while it contains undissolved block material and additional block material being added to the cage and the process is repeated of positioning the cage in the dissolution position, then flowing water turbulently over the block material in the cage during the advance stage, and then removing the cage before substantial run-off occurs.

5. A process according to claim 1, wherein the flocculating is caused by a process which comprises providing block material comprising copolymer of water-soluble ethylenically unsaturated anionic monomer optionally with water-soluble ethylenically unsaturated non-ionic monomer at the dissolution position, the copolymer having an intrinsic viscosity at least 10 dl/g.

6. A process according to claim 5, wherein the flocculating is caused by a process which comprises providing block material comprising copolymer of 50 to 95% by weight acrylamide and 5 to 50% by weight sodium acrylate at the dissolution position.

7. A process according to claim 1, wherein the flocculating is caused by a process which comprises providing block material having an intrinsic viscosity at least 15 dl/g at the dissolution position.

8. A process according to claim 1, wherein the flocculating is caused by a process which comprises providing block material comprising particles at least 90% by weight below 1 mm at the dissolution position.

9. A process according to claim 1, wherein the flocculating is caused by a process which comprises providing block material comprising particles at least 90% by weight between 10 µm and 150 µm at the dissolution position.

10. A process according to claim 8, wherein the flocculating is caused by a process which comprises providing block material comprising beads made by reverse phase polymerization at the dissolution position.

11. A process of irrigating soil adjacent to an elongated furrow that leads from an inlet end to an outlet end, the process comprising providing a supply of water from a header into the inlet end and allowing the supplied water to flow along the furrow and to infiltrate from the furrow into the soil adjacent the furrow as the water advances towards the outlet during an advance stage and thereafter as the water runs-off from the outlet end, and then terminating the supply, and in which erosion of the furrow is reduced and the infiltration is increased throughout the process by flocculating suspended soil particles from the water, the flocculating being caused by a process comprising providing a water-erodible block material which contains water-soluble polymeric flocculent at a dissolution position in the header or inlet end and flowing the supply of water turbulently over the block material whereby water falls onto exposed surfaces of the block material from the start of the advance stage and thereby dissolving flocculent into the water, and removing any residual block material from the dissolution position before substantial run-off occurs, wherein the block material comprises flocculent particles bonded into one or more blocks by water-soluble wax matrix wherein the wax is solid at 20° C. and melts below 250° C. and the dry weight ratio polymer:wax is 3:1 to 1:2.

12. A process according to claim 11, wherein the flocculating is caused by a process which comprises providing at the dissolution position block material comprising flocculent particles bonded into one or more blocks by water-soluble wax matrix wherein the wax is polyethylene glycol and the dry weight ratio polymer:wax is 2:1 to 1:1.

13. A process according to claim 11, wherein the flocculating is caused by a process which comprises providing at the dissolution position block material comprising flocculent particles bonded into one or more blocks by water-soluble wax matrix wherein the wax matrix is foamed.

14. A process of irrigating soil adjacent an elongated furrow that leads from an inlet end to an outlet end, the process comprising providing a supply of water from a header into the inlet end and allowing the supplied water to flow along the furrow and to infiltrate from the furrow into the soil adjacent the furrow, and in which erosion of the furrow is reduced and the infiltration is increased by flocculating suspended soil particles from the water by flowing the water in the header or the inlet end over exposed surfaces of solid anionic polymeric flocculant and in which the solid flocculant is a water-soluble polymer of water-soluble ethylenically unsaturated anionic monomer optionally with non-ionic monomer and having intrinsic viscosity at least 10 dl/g.

15. A process according to claim 14, further comprising flowing the water in the header or the inlet end over exposed surfaces of flocculant comprising particles of the flocculant bonded into a block by a water-soluble bonding agent.

16. A process according to claim 14, further comprising flowing the water in the header or the inlet end over exposed surfaces of flocculant comprising particles of acrylamide-sodium acrylate polymeric flocculant bonded as a block in a matrix of polyethylene glycol.

17. A process according to claim 16, further comprising flowing the water in the header or the inlet end over exposed surfaces of flocculant having intrinsic viscosity of at least 12 dl/g, the block material comprising particles of polymeric flocculant positioned in the inlet end of the furrow at a position where water flows over the block from the header.

18. A process of irrigating soil adjacent to an elongated furrow that leads from an inlet end to an outlet end, the process comprising providing a supply of water from a header into the inlet end and allowing the supplied water to flow along the furrow and to infiltrate from the furrow into the soil adjacent the furrow as the water advances towards the outlet during an advance stage and thereafter as the water runs-off from the outlet end, and then terminating the supply, and in which erosion of the furrow is reduced and infiltration is increased throughout the process by including dissolved polymeric flocculant in the water substantially only during the advance stage by contacting the water in the header or the inlet end turbulently with exposed surfaces of the polymeric flocculant in solid form from the start of the advance stage and substantially terminating the contact before substantial run-off occurs from the outlet end of the furrow.

19. A process according to claim 1, wherein the flocculating is caused by a process which comprises providing a water-erodible block material having a foamed matrix structure containing the water-soluble polymeric flocculent at the dissolution position.

20. A process according to claim 11, wherein the flocculating is caused by a process which comprises providing water-erodible block material having a foamed matrix structure containing the water-soluble polymeric flocculent at the dissolution position.

* * * * *